US006883920B2

United States Patent
Chen

(10) Patent No.: US 6,883,920 B2
(45) Date of Patent: Apr. 26, 2005

(54) ADJUSTING APPARATUS

(75) Inventor: Chun-Yao Chen, Miao-Li Hsien (TW)

(73) Assignee: Coretronic Corporation, Miao-Li Hsien (TW)

( * ) Notice: Subject to any disclaimer, the term of this patent is extended or adjusted under 35 U.S.C. 154(b) by 0 days.

(21) Appl. No.: 10/605,965

(22) Filed: Nov. 10, 2003

(65) Prior Publication Data

US 2004/0119952 A1 Jun. 24, 2004

(30) Foreign Application Priority Data

Dec. 19, 2002 (TW) .................................. 91221017 U

(51) Int. Cl.[7] .............................................. G03B 21/22
(52) U.S. Cl. ...................... 353/119; 353/74; 348/745
(58) Field of Search ......................... 353/119, 37, 47, 353/50, 51, 69, 70, 77, 78, 79, 98, 74; 248/133, 137–142, 371–195, 177.1, 178.1, 179.1, 180.1, 181.1, 188–188.7, 346.03, 346.05, 346.06, 913, 917–923; 362/269–275, 280–283, 285, 365, 366, 418, 419, 427, 428; 348/745, 785, 787–789, 794, 806

(56) References Cited

U.S. PATENT DOCUMENTS

| | | | | | |
|---|---|---|---|---|---|
| 2,922,609 | A | * | 1/1960 | Collier | 248/179.1 |
| 6,059,413 | A | * | 5/2000 | Okubo | 353/77 |
| 6,709,184 | B1 | * | 3/2004 | McDonald | 403/98 |
| 6,814,449 | B1 | * | 11/2004 | Yamada et al. | 353/74 |

* cited by examiner

Primary Examiner—Judy Nguyen
Assistant Examiner—Andrew Sever
(74) Attorney, Agent, or Firm—Winston Hsu

(57) ABSTRACT

An adjusting apparatus comprises a base, and a supporting frame, a fixed plate, a sliding stand, and a carrier, which are sequential stacked on the base. An optical engine is fixed on the carrier. By rotating the adjusting device, the axis position of optical engine can be adjusted along sliding slots guided by bulges. By using arc surfaces of the sliding stand and the carrier, the adjusting apparatus clips and pushes the blocks of the carrier to adjust the left and right angle of inclination of optical engine. Therefore, the light beam provided by optical engine could project on a screen precisely and reach the optimum projection performance.

10 Claims, 9 Drawing Sheets

ADJUSTING APPARATUS

BACKGROUND OF INVENTION

1. Field of the Invention

The present invention relates to an adjusting apparatus, and more particularly to an adjusting apparatus for use in angle or linear adjustment.

2. Description of the Prior Art

Referring to FIG. 1, a rear-projection television of the prior comprises a cover 1 and an optical projection system placed inside the cover 1. The optical projection system comprises an optical engine 2, a small refection mirror 3, a big reflection mirror 4, and a screen 5. An image beam provided by the optical engine 2 impinges onto the small reflection mirror 3 on the front of the optical engine 2, and then onto the big reflection mirror 4 placed on the light path of the reflection beam of the small reflection mirror 3. Finally, the image beam reflected by the big reflection mirror 4 projects on the screen 5 to display an image.

The optical engine 2 provides the image beam whose light path determines if the image of the screen is distortion. Hence, each optical device of the optical projection system, e.g. optical engine 2, small reflection mirror 3, and big reflection mirror 4, must be positioned at relatively exact positions and projection angles. But the optical devices inherently have manufacturing tolerances and assembly tolerances. Therefore, after assembling, the optical projection system need to adjust the relative positions and inclined angles of optical devices by use of an adjusting apparatus. Then, the optical projection system is able to reach predetermined shrunk and amplified ratio and resolve the image distortion and un-focus for achieving the optimum performance.

Referring to FIG. 2, a prior art adjusting apparatus 10 for an optical engine comprises a base 11, a bolt 12, and two sliding plates 13, 14 and a rotating carrier 15 sequentially placed on the base 11. The optical engine (not shown) is placed on the rotating carrier 15, and the highness of optical engine can be adjusted by rotating the bolt 12. Two pairs of guide rails 131, 141 are respectively placed along the corresponding sides of the two sliding plates 13, 14, to limit to the forward or backward, and right or left movement. One end of a rotating shaft pivots on the center of the rotating carrier 15, and the other end is fixed to the sliding plate 14. By rotating the rotating shaft, the sliding plate 14 rotates along the center of the rotating carrier 15 to adjust horizontal angle. With the above-mentioned adjusting apparatus, the optical engine can adjust highness, forward, backward, right and left directions, as well as horizontal angle for the optical engine. The above-mentioned adjusting apparatus can only provide the horizontal angle adjustment for optical engine, but not provide angle adjustments of left and right inclinations so that it cant effectively resolve the problems of image distortions and un-focus on screen. Hence, the adjusting apparatus for the optical engine needs to be improved.

SUMMARY OF INVENTION

One object of the present invention is to provide an adjusting apparatus, which modifies the rotation angle of projection images and the light path of image beam by adjusting left and right angles of inclination of an optical engine to resolve distortion of projection images and un-focus on a screen and to improve projection performance.

Another object of the present invention is to provide an adjusting apparatus with multi-axis adjustment to simplify the assembly for a rear-projection TV.

Further object of the present invention is to provide an adjusting apparatus, which can form a module of an optical engine and a small reflection mirror.

To achieve the above and other objects, an adjusting apparatus of the present invention comprises a base, a supporting frame, a fixed plate, a sliding stand, and a carrier carrying an optical engine. The supporting frame, the fixed plate, the sliding stand, and the carrier sequentially stack on the base. The side surfaces of the supporting frame form at least one flank. The flank has at least one sliding slot. The base has at least one bulge that co-operates with the sliding slot. A third adjusting device has one end clipping to the base and the other end screwing to and driving the supporting frame moving. A third fixing device screws together the supporting frame and the base. The fixed plate has at least one sliding bulge. The side surface of the sliding stand has at least one flank. The flank has a sliding slot corresponding to the bulge. A first adjusting device has one end clipping to the fixed plate, the other end screwing to and driving the sliding stand axis moving. A first fixing device screws and connects to the sliding stand and the fixed plate. The sliding stand and the carrier respectively have corresponding arc surface. The center of the sliding stand has an opening, and the carrier has a block corresponding to the opening. A second adjusting device passes through the sliding stand and has one end clipping to the block to push the carrier rotating and change inclination angle of the optical engine. A second fixing device screws and connects to the carrier and the sliding stand.

BRIEF DESCRIPTION OF DRAWINGS

The above and other objects, advantages, and features of the present invention will be understood from the following detailed description of the invention when considered in connection with the accompanying drawings below.

DETAILED DESCRIPTION

The First Embodiment

Figure 3:
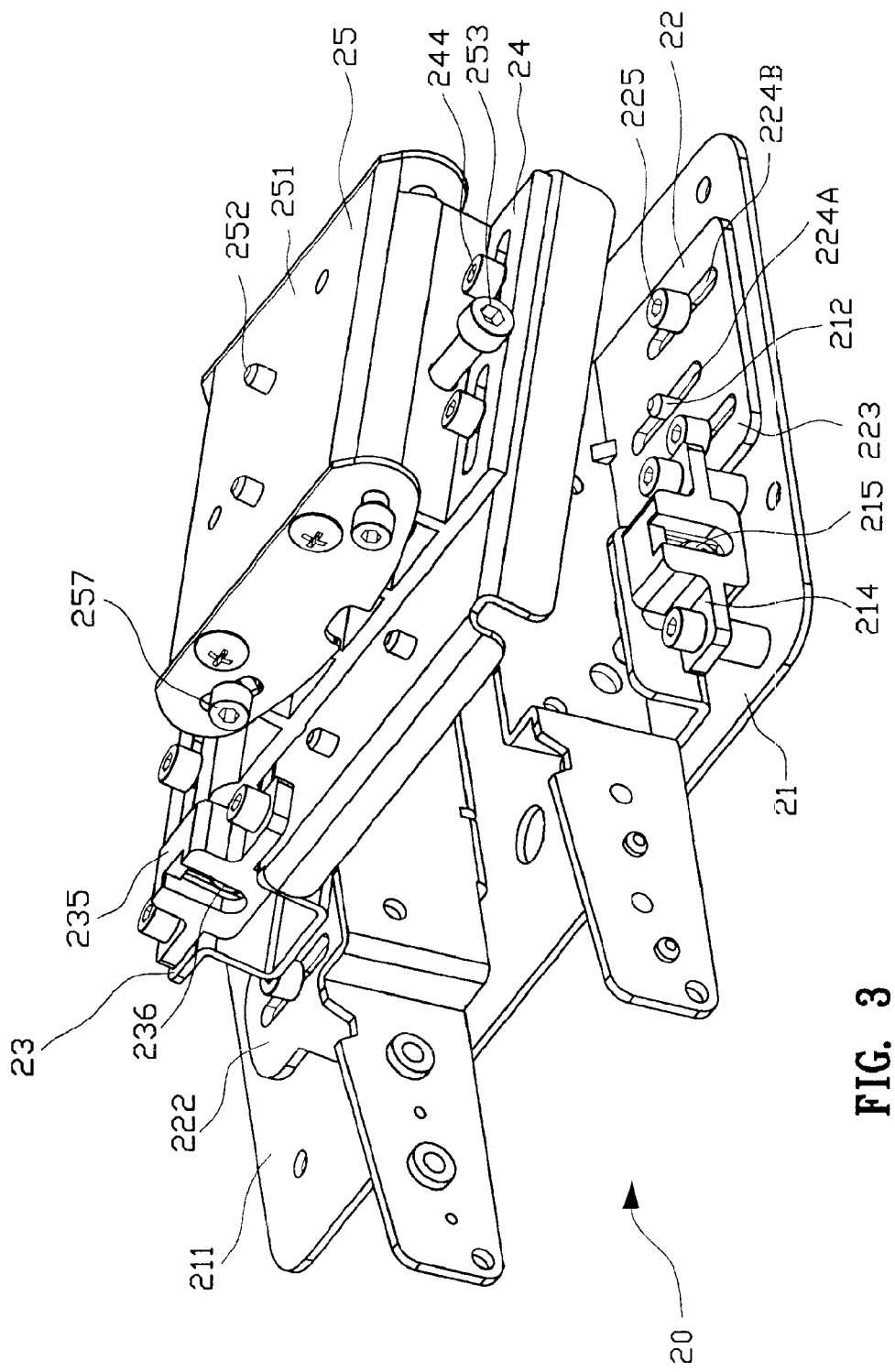
FIG. 3 is a perspective view of an adjusting apparatus of the first embodiment of the present invention.
Figure 4:
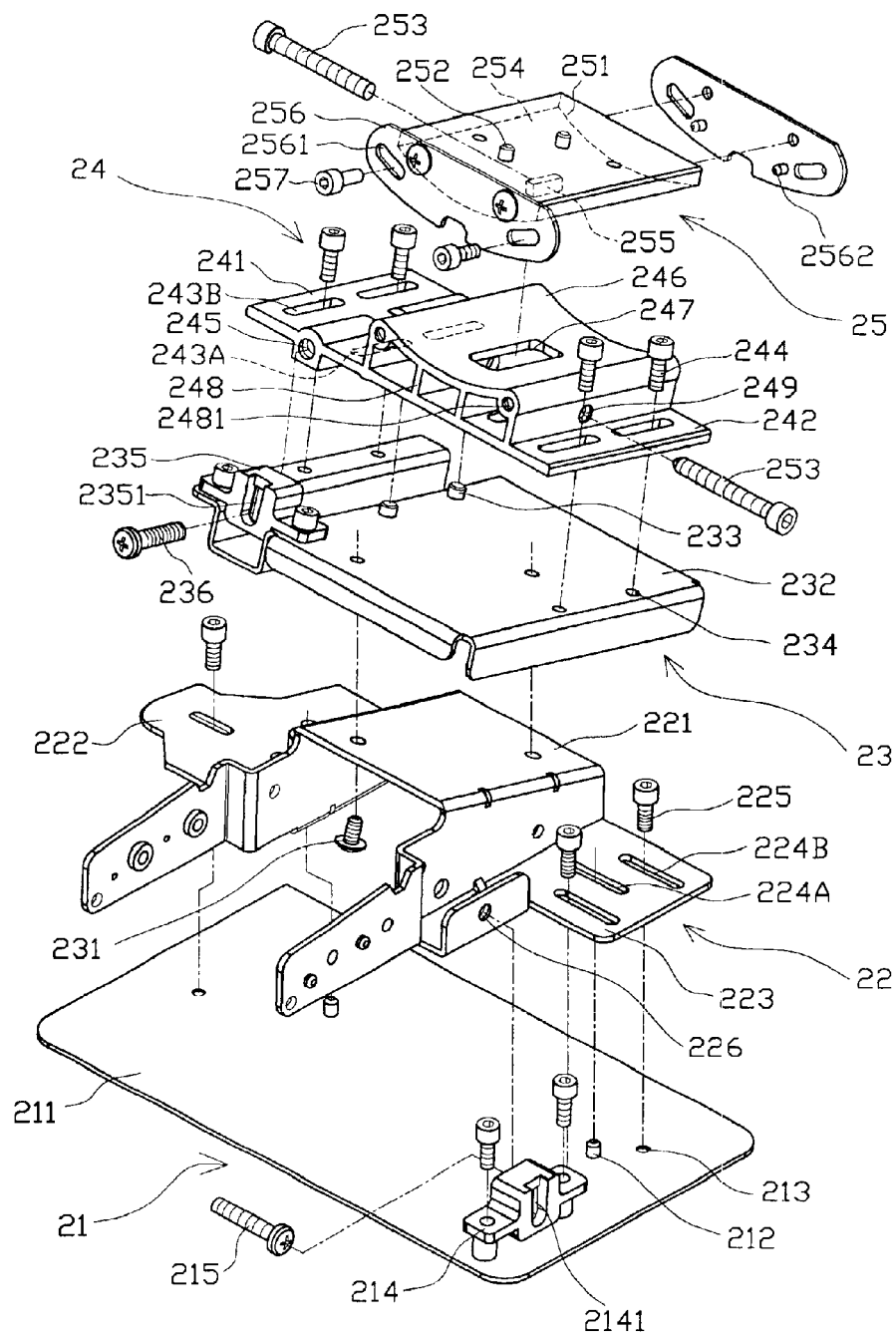
FIG. 4 is an exploded perspective view of an adjusting apparatus of the first embodiment of the present invention.

Referring to FIG. 3 and FIG. 4, an adjusting apparatus 20 of the present invention comprises a base 21, a supporting frame 22, a fixed plate 23, a sliding stand 24, and a carrier 25. The upper surface 251 of the carrier 25 has at least one fixing pin 252 for fixing an optical engine (not shown).

The base 21 has an upper surface 211. Two edges of the upper surface 211 have a plurality of bulges 212 and fixing openings 213, and one of the edges further has a hold 214. Inside the hold 214 has a receiver 2141. A third adjusting device 215 passes through the hold 214 and has one end clipping into the receiver 2141 of the hold 214.

The supporting frame 22 is placed on the upper surface 211 of the base 21, and has a top surface 221 which exists an angle of inclination to the base 21. Two edges of the top surface 221 respectively form a left flank 222 and a right flank 223, which form a hat-shape body. The left flank 222 and the right flank 223 have a plurality of sliding slots 224A and 224B. The sliding slots 224A correspond to the bulges 212. A plurality of third fixing devices 225 is provided to perpendicularly pass through the sliding slots 224B and, then, screw to the fixing openings 213 to connect the base 21 and the supporting frame 22. The supporting frame 22 has an adjusting opening 226 behind the backside of the hold 214. One end of the third adjusting devices 215 parallel to the direction of sliding slots 224A passes through the hold 214 and, then, screws to the adjusting opening 226 to drive the movement of the supporting frame 22.

Figure 5:
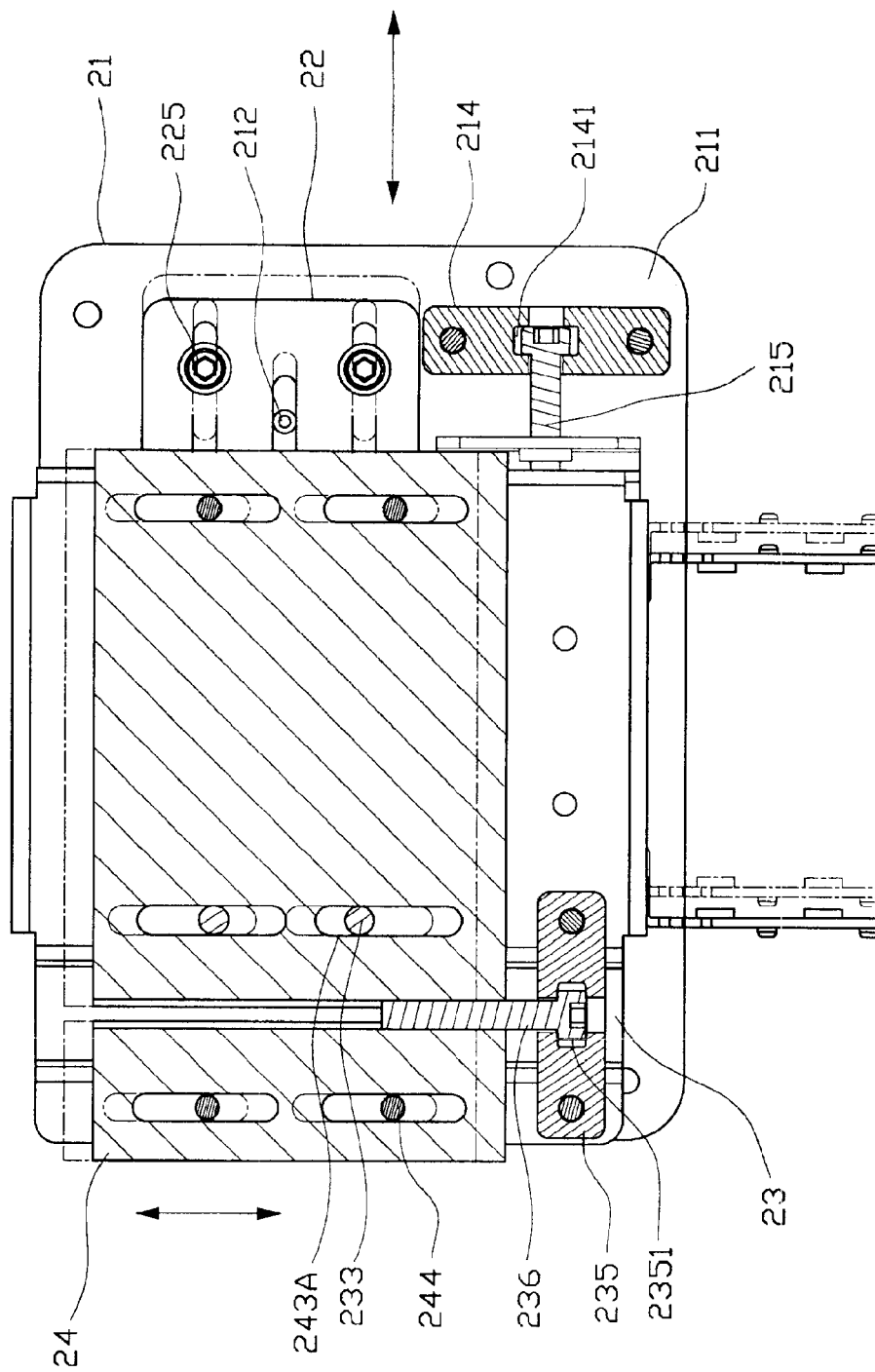
FIG. 5 is a sectional view of an axis adjustment of an adjusting apparatus of the present invention.

Referring to FIG. 5 showing function of the adjusting apparatus 20, a supporting point is formed by using the receiver 2141 of the hold 214 to clip one end of the third adjusting device 215, and the bulges 212 guides the sliding slot 224B. As loosening the third fixing device 225, the third adjusting device 215 is rotated to drive the supporting frame 22 moving along the direction of the sliding slot 224A to the predetermined position, and then the third fixing device 225 is fastened to fix the supporting frame 22. On the contrast, as loosening the third fixing device 225, the third adjusting device 215 is reversely rotated to drive the supporting frame 22 to the predetermined position in opposite direction. Therefore, the adjusting apparatus 20 of the present invention can reach the first axis adjustment.

Referring to FIG. 3 and FIG. 4 again, the fixed plate 23 is screwed with a screwing device 231 to the top surface 221 of the supporting frame 22. Due to the inclination top surface 221, there is an angle of inclination between the fixed plate 23 and the base 21. The fixed plate 23 has an upper surface 232, on which has a plurality of bulges 233 and fixing openings 234, and one edge of the fixed plate 23 has a hold 235. A is receiver 2351 is inside the hold 235, and a first adjusting device 236 passes through the hold 235 and has one end clipping into the receiver 2351 of the hold 235.

The sliding stand 24 is placed on the upper surface 232 of the fixed plate 23, whose two edges form a left flank 241 and a right flank 242. The left flank 241 and the right flank 242 have a plurality of sliding cavities 243A corresponding to the bulges 233 and a plurality of sliding cavities 243B. First fixing devices 244 perpendicularly pass through the sliding cavities 243B. The side surface of the sliding stand 24 has a screw hole 245 behind the backside of the hold 235 of the fixed plate 23. One end of the first adjusting devices 236 parallel to the direction of sliding cavities 243A passes through the fixed plate 23 and, then, screws to the screw hole 245 to drive the sliding stand 24 moving along the direction of the sliding cavities 243A.

Referring to FIG. 5 which shows function of the adjusting apparatus 20, as loosening the first fixing device 244, the bulges 233 and the sliding cavities 243 cooperate with each other to guide and, the receiver 2351 of the hold 235 clips one end of the first adjusting device 236 to form a supporting point. So press the first adjusting device 236 to drive the sliding stand 24 moving along the direction of the sliding cavity 243A to the predetermined position. Then, the first fixing device 244 screws to fix the sliding stand 34. On the contrast, as loosening the first fixing device 244, the first adjusting device 236 is reversely rotated to drive the sliding stand 24 to the predetermined position in opposite direction. Therefore, the above-mentioned adjusting apparatus 20 can reach the second axis adjustment.

As shown in FIG. 3 and FIG. 4, the center of the sliding stand 24 has a frame 248. The frame 248 has a rectangular opening 247 at the center of its upper arc surface 246. Two edges of the frame 248 have a screwing hole 249 interlinked to the opening 247. A second adjusting device 253 passes through the screwing hole 249. End surfaces of the frame 248 have fixing openings 2481.

The carrier 25 is placed on the arc surface 246 of the sliding stand 24. Down surface 254 of the carrier 25 is a convex arc surface corresponding to concave arc surface of the sliding stand 24. Two end surfaces of the carrier 25 respectively fasten an arc plank 256. The arc planks 256 have arc cavities 2561 according to the arc curvature of the sliding stand 24. The positions of the arc cavities 2561 are corresponding to the fixing opening 2481 of the sliding stand 24. A second fixing device 257 passes through the arc cavities 2561 and screws to the fixing opening 2481 to fix the carrier 25. Inside surface of the arc plank 256 has a plurality of supporting pins 2562 which clip the upper arc surface 246 of the frame 248 so that the carrier 25 and sliding stand 24 form sliding connection. Down surface has a block 255 corresponding to the position of the opening 247. The block 255 is smaller than the rectangular opening 247 and is received inside the opening 247 so that the second adjusting device 253 passes through the screwing hole 249 and, then, one end of the second adjusting device 253 is clipped to the block 255.

Figure 6:
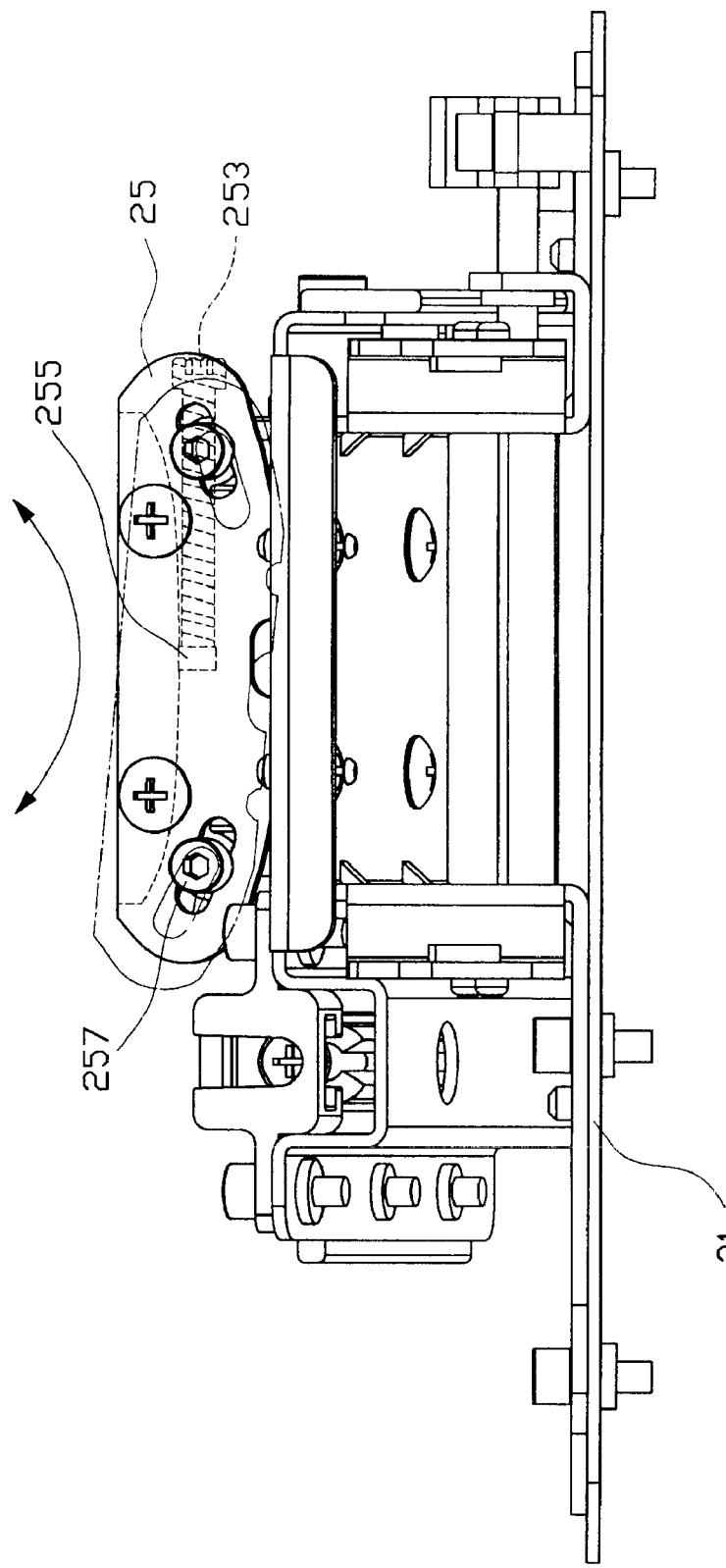
FIG. 6 is a front view of an angle adjustment of an adjusting apparatus of the present invention.

Referring to FIG. 6 which shows function of the adjusting apparatus 20, as loosening the second fixing device 257, the second adjusting device 253 is rotated to push the block 255 so that the carrier 25 rotating along the arc surface of the sliding stand 24 to adjust the left and right angles of inclination of the carrier 25. On the contrast, the second adjusting device 253 is reversely rotated to drive the carrier 25 to the predetermined position. Therefore, the above-mentioned adjusting apparatus 20 can reach the third axis adjustment. In addition, as the center of optical engine is placed the center of the arc surface of the sliding stand 24, the second adjusting device 253 makes optical engine rotate around the center of optical axis so that it can adjust the rotation angle of projection images and can improve distortion of projection images and un-focus on screen.

Hence, as optical engine fastens on the upper surface 251 of the carrier 25, by respectively rotating the first adjusting device 236, the second adjusting device 253 and the third adjusting device 215, the position and inclination angle of optical engine are quickly adjusted to make image beam, provided by optical engine, precisely project on screen and reach optimum performance.

Figure 1:
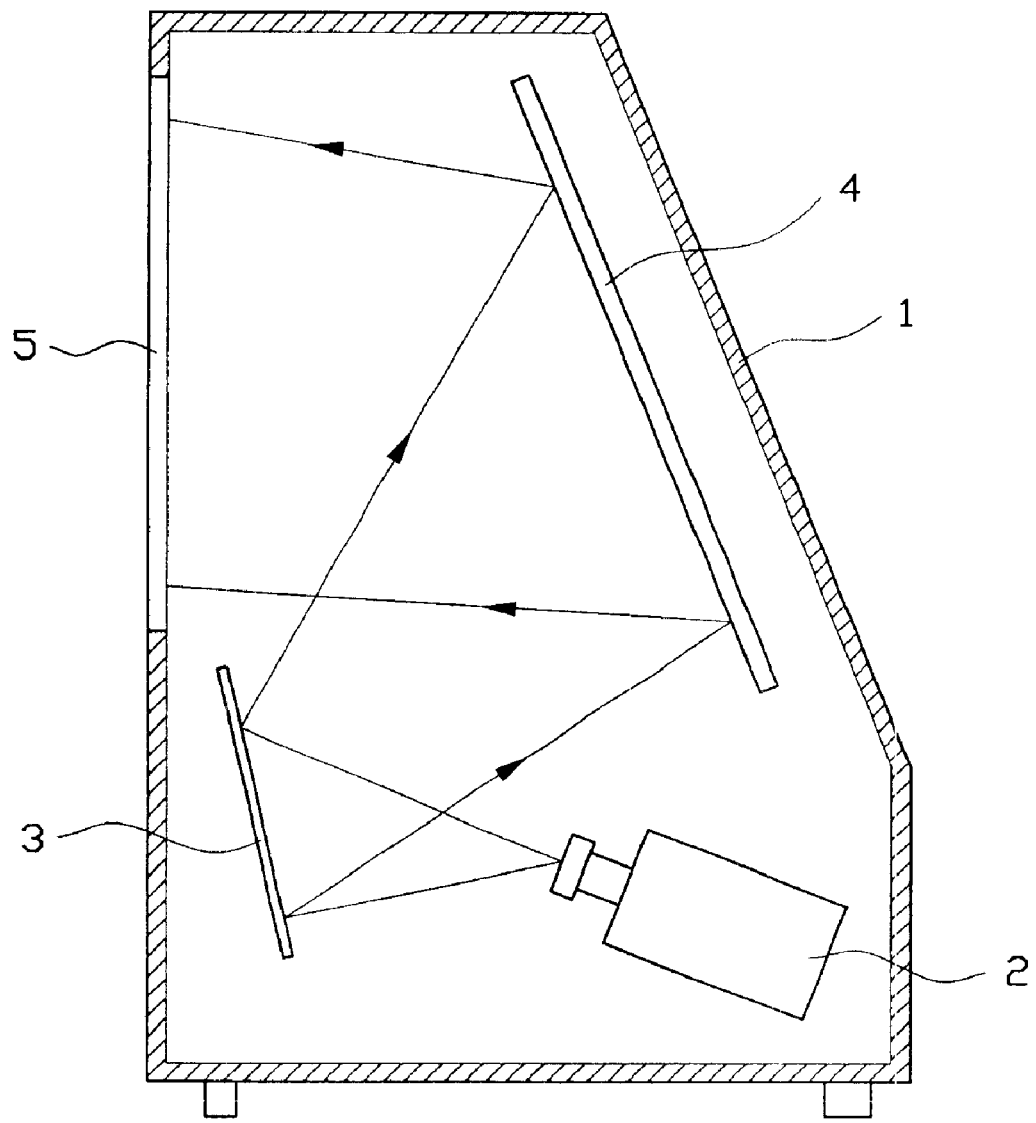
FIG. 1 is a schematic view of an optical projection for rear-projection TV of the prior art.
Figure 2:
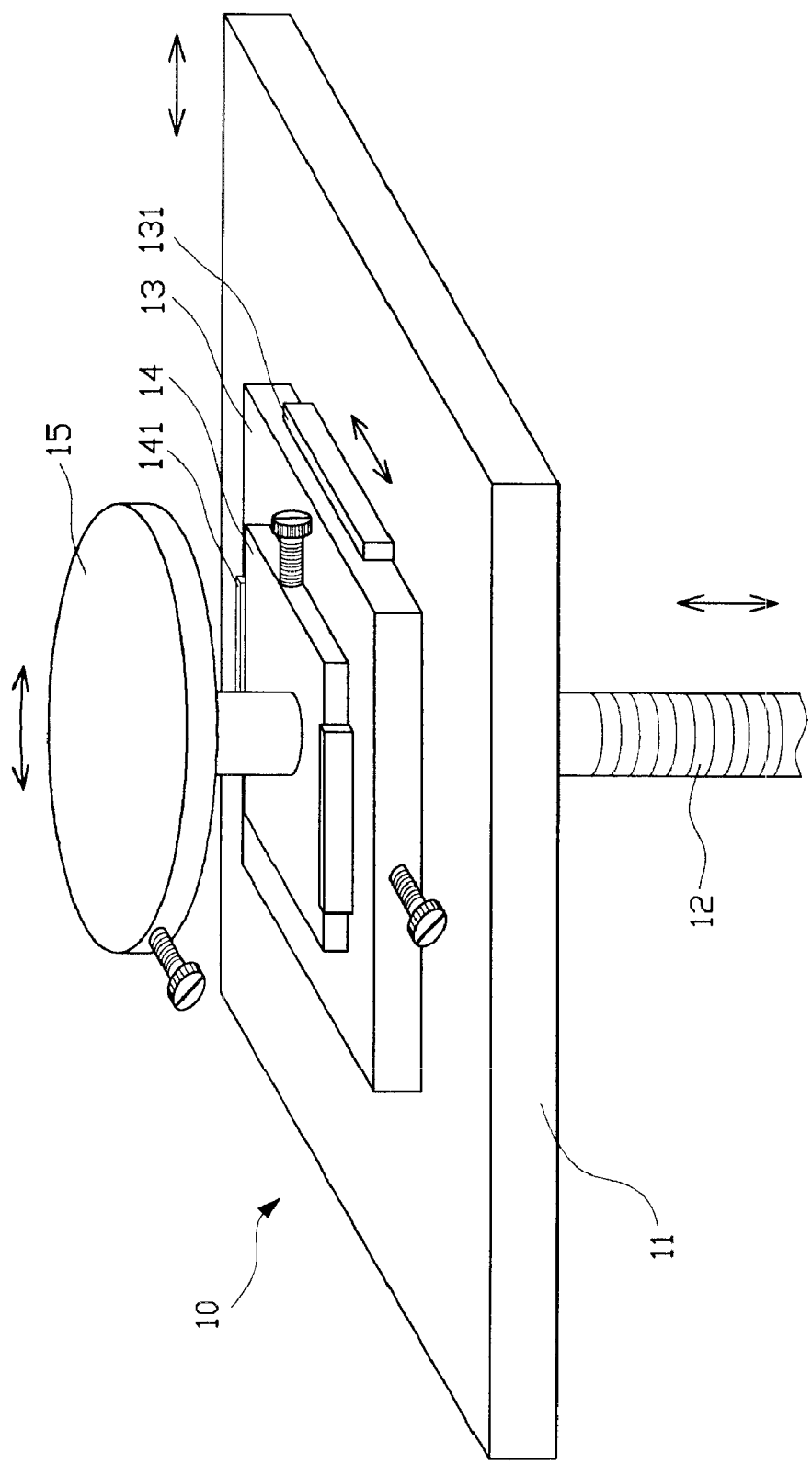
FIG. 2 is a perspective view of an adjusting apparatus of optical engine of the prior art.

In addition, there is an inclination angle between the supporting frame 22 and base 21. The fixed plate 23, the sliding stand 24 and carrier 25 having optical engine sequentially stack on the supporting frame 22 so that there is an angle of inclination between optical engine and the base 21. Hence, the adjusting apparatus 20 can apply to optical system of rear-projection TV whose optical engine needs inclined projecting beam (shown in FIG. 1). As a result, the third adjusting device 215 moves optical engine along the axis of the base 21, the first adjusting device 236 makes optical engine move along the inclined surface of the supporting frame 22, and the second adjusting device 253 makes optical engine rotate around the center of the arc surface to adjust the left and right inclination angle of optical engine.

Figure 7:
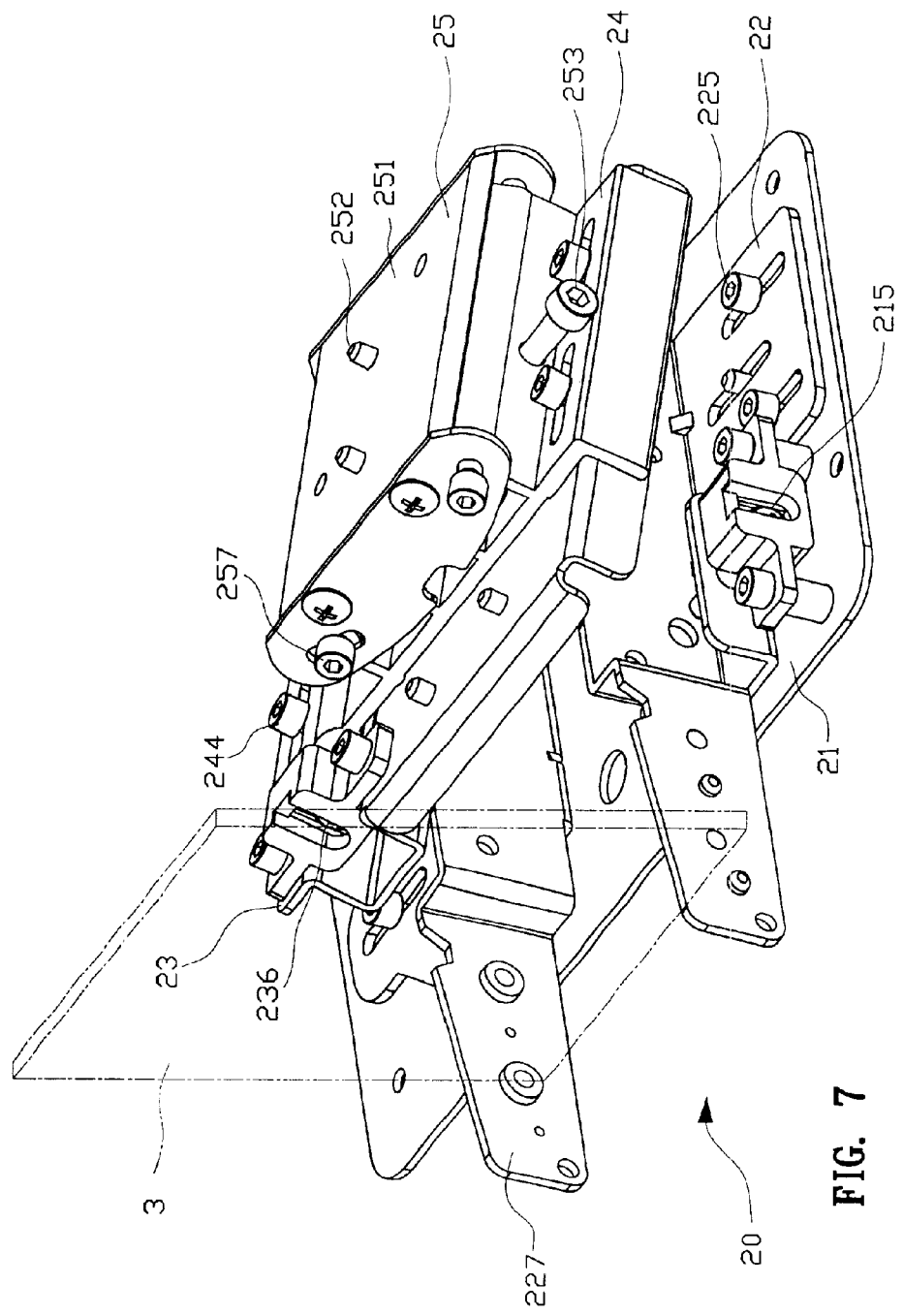
FIG. 7 is a perspective view of a reflection mirror combined with an adjusting apparatus of the present invention.

Furthermore, referring to FIG. 7, two edges of the top surface 221 of the supporting frame 22 respectively have a connection plank 227 for screwing a small mirror 3 so that the small mirror 3 and optical engine can combine as a module to place inside rear-projection TV to simply the fabricating steps.

The Second Embodiment

Figure 8:
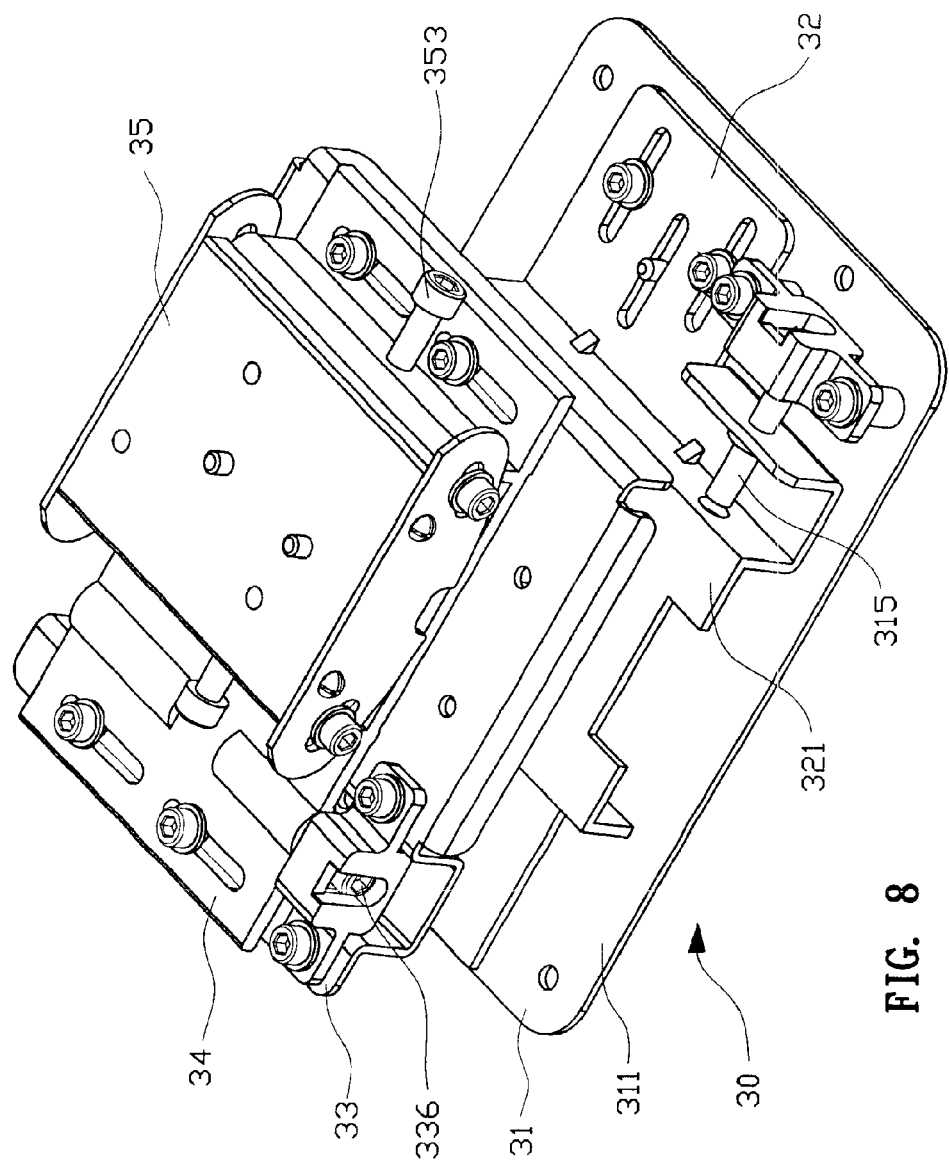
FIG. 8 is a perspective view of an adjusting apparatus of the second embodiment of the present invention.
Figure 9:
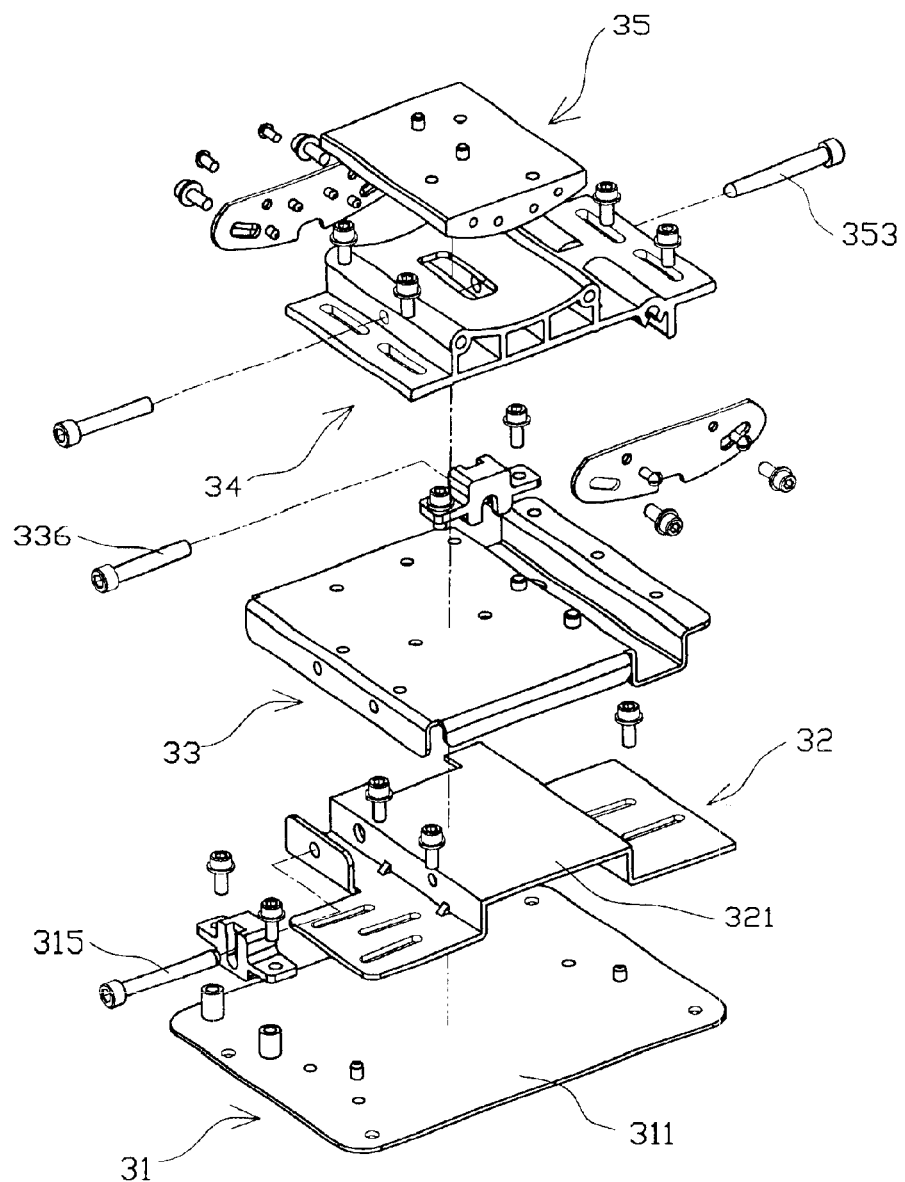
FIG. 9 is an exploded perspective view of an adjusting apparatus of the second embodiment of the present invention.

As shown in FIG. 8 and FIG. 9 that show an adjusting apparatus 30 of the second embodiment of the present invention, the basic structure of the present embodiment is similar to that of the first embodiment. The differences between the present embodiment and the first embodiment are that a top surface 321 of a supporting frame 32 is parallel to a upper surface 311 of a base 31 such that a fixed plate 33, a sliding stand 34, and a carrier 35 having optical engine, sequentially stacking on the supporting frame 32, are still parallel to the base 31. The basic method for adjusting position of optical engine of the present embodiment is the same as the first embodiment. By rotating the first adjusting device 336, the second adjusting device 353, and the third adjusting device 315, the position and inclination angle of optical engine can be quickly adjusted to make image beam, provided by optical engine, precisely project on screen and reach optimum performance.

It will be apparent to those skilled in the art that in light of the forgoing disclosure, many alternations and modifications are possible in the practice of this invention without departing from the spirit or scoop thereof. Accordingly, the scoop of the invention is to be considered in accordance with the substance defined in the following claims.

What is claimed is:

1. An adjusting apparatus comprising:
   a fixed plate which has an upper surface with at least one bulge;
   a sliding stand carried on said upper surface of said fixed plate and having an upper arc surface with an opening, side surfaces, and at least one first fixing device, said side surfaces forming at least one flank with a sliding cavity corresponding to said bulge, said first fixing device screwing and connecting said sliding stand to said fixed plate;
   at least one first adjusting device which has one end clipping to said fixed plate and the other end screwing to said sliding stand;
   a carrier placed on said arc surface, which has a down surface cooperating with said arc surface, a block corresponding to said opening, and at least one second fixing device screwing and connecting said carrier to said sliding stand; and
   at least one second adjusting device which passes through said sliding stand and has one end clipping to said block.

2. The adjusting apparatus according to claim 1, wherein said carrier further comprises an upper surface carrying an optical engine.

3. The adjusting apparatus according to claim 1, further comprising a base below said fixed plate and a supporting frame between said base and said fixed plate, and said supporting frame having a top surface connecting to said fixed plate.

4. The adjusting apparatus according to claim 3, wherein an angle of inclination exists between said top surface and said base.

5. The adjusting apparatus according to claim 3, wherein said top surface is parallel to said base.

6. The adjusting apparatus according to claim 3, wherein two edges of said top surface of said supporting frame respectively have a connection plank for connecting a reflection mirror.

7. The adjusting apparatus according to claim 3, wherein side surfaces of said supporting frame forms at least one flank with at least one sliding slot, and said base has at least one bulge corresponding to said sliding slot.

8. The adjusting apparatus according to claim 7, further comprising at least one third adjusting device which has one end clipping to said base and the other end screwing to said supporting frame, and at least one third fixing device screwing and connecting said supporting frame to said base.

9. The adjusting apparatus according to claim 7, wherein said sliding slot of said supporting frame is perpendicular to said sliding cavity of said sliding stand.

10. The adjusting apparatus according to claim 1, wherein end surfaces of said carrier respectively have an arc plank with an arc cavity for guiding.

* * * * *